United States Patent [19]

Mørch

[11] Patent Number: 4,801,063
[45] Date of Patent: Jan. 31, 1989

[54] APPARATUS FOR INSERTING STICKS INTO ICE CREAM BODIES

[75] Inventor: Ole C. Mørch, Solrød Strand, Denmark

[73] Assignee: NTC Engineering APS, Herlev, Denmark

[21] Appl. No.: 40,318

[22] Filed: Apr. 20, 1987

[30] Foreign Application Priority Data

Apr. 21, 1986 [DK] Denmark .............................. 1832/86

[51] Int. Cl.⁴ .............................................. A23G 9/26
[52] U.S. Cl. ..................................... 227/45; 425/126.2
[58] Field of Search .......................... 227/45, 48, 120; 425/126 S; 198/803.14, 690.2, 698, 699; 414/13; 221/253, 218; 29/DIG. 73, DIG. 99

[56] References Cited

U.S. PATENT DOCUMENTS

| | | | |
|---|---|---|---|
| 1,953,506 | 4/1934 | Schnaier | 425/126 S |
| 3,038,635 | 6/1962 | Rasmusson | 221/81 |
| 3,478,703 | 11/1969 | Peppler et al. | 425/126.2 |
| 4,105,384 | 8/1978 | Morch | 425/126 S |
| 4,568,010 | 2/1986 | Dilo | 227/120 |
| 4,592,709 | 6/1986 | Gram | 425/126 S |

Primary Examiner—Donald R. Schran
Assistant Examiner—James L. Wolfe
Attorney, Agent, or Firm—Felfe & Lynch

[57] ABSTRACT

An apparatus for inserting sticks into ice cream bodies contains a magazine 2, from where the sticks 1 are discharged to a carrier 4, which is provided with pockets 6 for receiving the sticks 1. The sticks 1 are fed from the pockets 6 to mold cavities filled with ice cream, by clamping devices 8 mounted in a pick-up assembly 7, which can be moved between a position in which the sticks 1 are lifted out of the pockets 6 to a position above mold cavities containing ice cream. A piston 3 is placed in the magazine 2. The piston is designed to squeeze the sticks 1 in the magazine against the carrier with an abutment force substantially greater than the weight of the sticks stacked in the magazine.

5 Claims, 1 Drawing Sheet

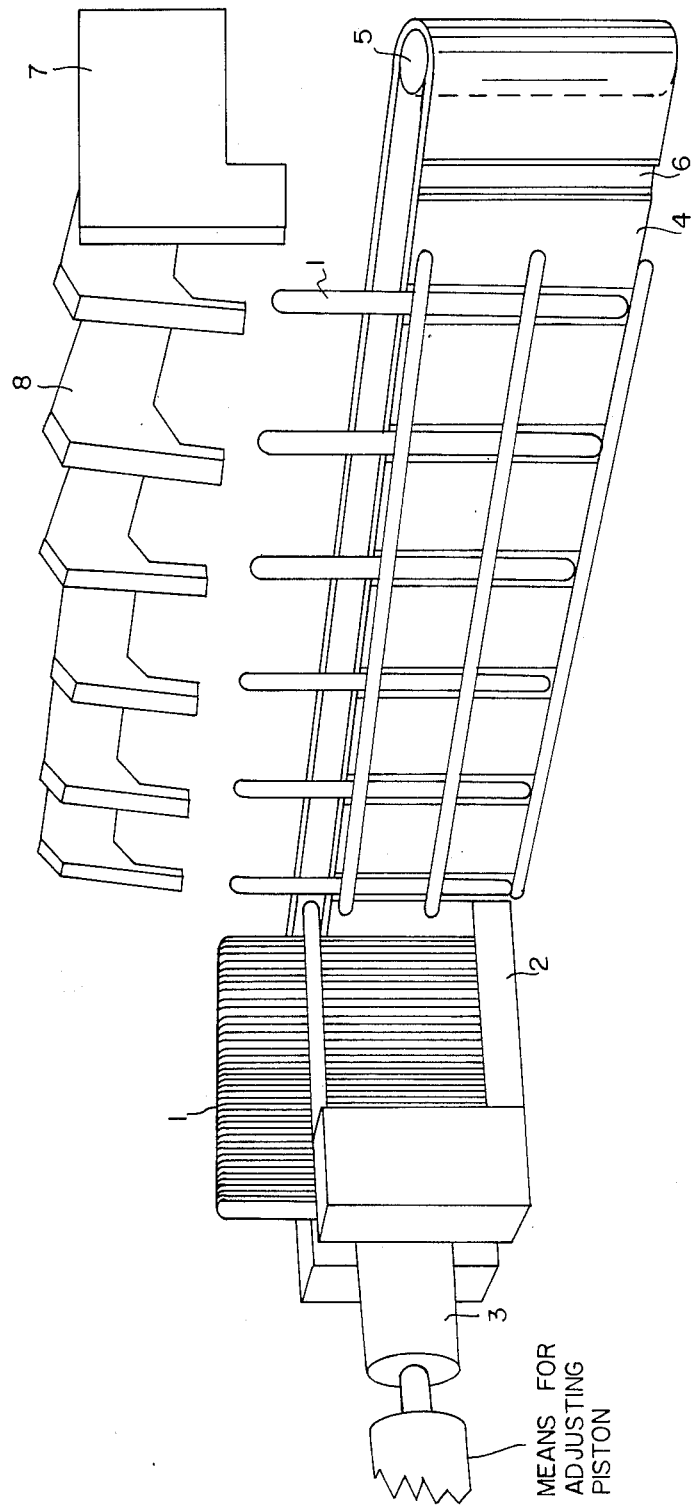

APPARATUS FOR INSERTING STICKS INTO ICE CREAM BODIES

The invention relates to an apparatus for inserting sticks into ice cream bodies and of the type where the sticks are stacked in a magazine, from where they are discharged individually to a carrier, which passes the discharge opening of the magazine, and which is provided with pockets for receiving the sticks, whereby the sticks are fed from the pockets in the carrier to mold cavities filled with ice cream, by means of clamping apparatus mounted in an assembly, which can be moved between a position in which the sticks are lifted free of the pockets in the carrier to a discharge position aligned with the mold cavities.

An apparatus of this type is known from Danish Patent Application No. 2884/75 and corresponding U.S. Pat. No. 4,105,384, which are incorporated herein by reference. The apparatus according to Danish Application No. 2884/75 and U.S. Pat. No. 4,105,384 is designed so as to function even in the case of deformed sticks, but it has been found that crooked sticks, several of which may follow one another in the magazine, continue to give rise to functional trouble.

An object of the invention is to provide an apparatus which enables problem-free handling of the sticks, even in case of frequent occurrence of very crooked or otherwise deviating sticks.

According to the invention, this object is achieved by an apparatus of the type referred to in the opening paragraph, characterized in that it contains means for squeezing the sticks in the magazine against the carrier with an abutment force substantially greater than the weight of the sticks stacked in the magazine.

Using a positive abutment pressure of a predetermined, expedient size, the sticks will firstly be caused to line up during feeding through the magazine, thus preventing skew running of the sticks in the magazine, causing them to get stuck, and secondly the sticks will snap vigorously into the recesses in the carrier. This will be the case irrespective of any deformation or curvatures of the sticks as opposed to conventional apparatuses relying solely on the use of the weight of the superimposed sticks to squeeze the bottom stick in the magazine down into the recess of the carrier.

According to the invention, the means for squeezing the sticks against the carrier can, for example, be a cylinder-piston unit, and means can be provided for setting/adjusting the squeeze pressure of the piston.

The use of a cylinder-piston unit provides a simple mechanical solution, and the control or optionally the adjustment of the abutment pressure can be made an integral part of the control unit of the entire apparatus.

In a preferred embodiment, the sticks are fed upstanding through the magazine with their longitudinal axes extending vertically.

As the sticks preferably are to be placed in vertical mold cavities, this provides a possibility for a simpler transfer assembly, as the sticks are simply to be parallel-shifted down into the mold cavities. In horizontal machines it is necessary to turn the sticks at least 90°.

According to the invention, the carrier can be an endless belt with recesses corresponding to the sticks.

The endless belt permits a high operating speed, since no time is wasted in a superfluous return stroke as in the case of conventional apparatus operating with a reciprocating slide.

According to the invention, the belt can be made of a resilient material with reinforcements along the edges around the recesses for receiving the sticks.

On the one hand, this combination provides the certainty of deformed sticks being impressed, as the comparatively soft material will yield to the sticks, and on the other the certainty that the sticks will be pulled away from the end of the magazine as a result of the reinforcements in the surface of the belt by designing the belt for intermittent conveying, as taught according to the invention.

In this way, the belt can be caused to stop at a work station, where a number of sticks will be removed from the belt according to a predetermined work sequence in the apparatus as a unit.

In accordance with the invention, an apparatus for inserting sticks into ice cream bodies comprises a magazine, having a discharge opening, in which sticks are stacked for discharging the sticks through a discharge opening individually; a carrier which passes the discharge opening of the magazine and which includes pockets for receiving the sticks and which feeds the sticks from the pockets in the carrier to mold cavities filled with ice cream; means mounted in an assembly and movable between a position in which the sticks are lifted free of the pockets in the carrier to a discharge position aligned with mold cavities, the apparatus including means to squeeze the sticks from the magazine against the carrier with an abutment force substantially greater than the weight of the sticks stacked in the magazine.

For a better understanding of the invention, together with other and further objects thereof, reference is made to the following description, taken in connection with the accompanying drawing, and its scope will be pointed out in the appended claims.

The drawing is a perspective, schematic view of an apparatus constructed according to the invention.

The drawing shows an embodiment in which the sticks 1 are placed vertically in a magazine 2. The sticks are squeezed through the magazine by means of the piston 3, thus being caused to engage the belt 4.

The belt 4 is designed to pass reversing rollers 5 and is provided with pockets or recesses 6 for receiving the sticks 1 when the pockets 6 pass the magazine 2. When letting the pockets have a recess corresponding to the sticks, it is certain that one stick, and one only, is fed into each pocket.

The belt 4 is made of a comparatively resilient material, so that any deformed sticks can be squeezed into the pockets 6, even though it only has a depth that corresponds to the sticks. Along the edges, the pockets 6 are reinforced by lengthwise fillets or similar devices, which form a well-defined abutment for the sticks 1.

Along part of the longitudinal extent of the belt 4 there is a pick-up assembly 7, which can be moved between a position in which the clamping devices 8, rotatably journalled in the assembly 7, are clamped over the ends of the sticks, and a position perpendicularly above a mold cavity with ice cream (not shown) for insertion of the sticks 1 into the mold cavities.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A mechanism for leading sticks, especially in preparation for subsequent insertion of sticks into ice cream bodies or the like, from
    (a) a magazine, in which the sticks are stacked in parallel with abutting broad sides, into
    (b) a carrier in the form of a belt made of flexible material comprising at intervals transversely placed pockets with a form corresponding to the form of the sticks for reception of the sticks, said carrier being adapted to be moved in its longitudinal direction past the one end of the magazine, comprising:
    squeezing means arranged at the other end of the magazine for squeezing the stick at any time being first in the stack into a pocket in the carrier opposite the magazine,
    the squeezing means exerting a pressure adequate to flatten any crooked or arched sticks, and
    the carrier being provided with reinforcements along the edges of the pockets.

2. A mechanism according to claim 1, which includes fillets placed along the pockets for reinforcing the edges of the pockets.

3. A mechanism according to claim 1, in which the carrier is adapted to step-wise conveying.

4. A mechanism according to claim 1, in which the carrier comprises an endless belt.

5. An apparatus for inserting sticks into ice cream bodies or the like comprising
    (a) a first mechanism for conveying sticks from a magazine into an elongated carrier, and
    (b) a second mechanism for leading the sticks from the carrier to the ice cream bodies,
    (c) the first mechanism comprising a magazine, in which the sticks are stacked in parallel with abutting broad sides, and a carrier in the form of a belt made of flexible material comprising at intervals transversely placed pockets with a form corresponding to the form of the sticks for reception of the sticks, said carrier being adapted to be moved in its longitudinal direction past one end of the magazine, comprising:
    squeezing means arranged at the other end of the magazine for squeezing the stick at any time being first in the stack into a pocket in the carrier opposite the magazine,
    the squeezing means exerting a pressure adequate to flatten any crooked or arched sticks, and
    the carrier being provided with reinforcements along the edges of the pockets, the first mechanism being oriented with the pockets placed in the carrier mainly in parallel with the direction, with which the sticks in the ice cream bodies shall be inserted into the ice cream bodies.

* * * * *